(12) United States Patent
Bian et al.

(10) Patent No.: US 11,920,212 B2
(45) Date of Patent: Mar. 5, 2024

(54) METHOD FOR DISSOLVING METALS BY PHOTOCATALYSIS

(71) Applicant: Shanghai Normal University, Shanghai (CN)

(72) Inventors: Zhenfeng Bian, Shanghai (CN); Yao Chen, Shanghai (CN); Mengjiao Xu, Shanghai (CN); Lili Lin, Shanghai (CN); Jieya Wen, Shanghai (CN); Yu Wan, Shanghai (CN); Li Liu, Shanghai (CN); Hexing Li, Shanghai (CN)

(73) Assignee: SHANGHAI NORMAL UNIVERSITY, Shanghai (CN)

( * ) Notice: Subject to any disclaimer, the term of this patent is extended or adjusted under 35 U.S.C. 154(b) by 780 days.

(21) Appl. No.: 17/042,775

(22) PCT Filed: Oct. 10, 2019

(86) PCT No.: PCT/CN2019/110382
§ 371 (c)(1),
(2) Date: Sep. 28, 2020

(87) PCT Pub. No.: WO2020/206962
PCT Pub. Date: Oct. 15, 2020

(65) Prior Publication Data
US 2021/0371952 A1 Dec. 2, 2021

(30) Foreign Application Priority Data

Apr. 12, 2019 (CN) .......................... 201910294530.4

(51) Int. Cl.
C22B 3/16 (2006.01)
B01J 21/06 (2006.01)
B01J 35/00 (2006.01)

(52) U.S. Cl.
CPC ............... *C22B 3/16* (2013.01); *B01J 21/063* (2013.01); *B01J 35/004* (2013.01)

(58) Field of Classification Search
CPC .......... C22B 3/10; B01J 21/063; B01J 35/004
See application file for complete search history.

(56) References Cited

U.S. PATENT DOCUMENTS

2005/0044991 A1 3/2005 Guo et al.
2021/0371952 A1* 12/2021 Bian .................... B01J 31/0244

FOREIGN PATENT DOCUMENTS

CN 86106986 A 8/1987
CN 1073984 A 7/1993
(Continued)

Primary Examiner — Scott R Kastler
(74) Attorney, Agent, or Firm — HAMRE, SCHUMANN, MUELLER & LARSON, P.C.

(57) ABSTRACT

The present invention relates to a method for dissolving metals by photocatalysis. A metal-containing material to be dissolved is dispersed in a mixed solution of photocatalyst-containing cyanide and organic chloride; then, a photocatalyst is added; next, an oxygen-containing gas or a substance which is capable of generating oxygen is introduced; and irradiation is applied for a period of time to dissolve metals. Compared with the prior method, the present invention is advantageous in moderate reaction condition, energy conservation, environmental protection, low cost, and convenient operation, and is suitable for mass industrial treatment on metal dissolution.

12 Claims, 1 Drawing Sheet

(56) References Cited

FOREIGN PATENT DOCUMENTS

| | | | |
|---|---|---|---|
| CN | 107586966 A | 1/2018 | |
| CN | 108658133 A | 10/2018 | |
| CN | 108906102 A | 11/2018 | |
| JP | S63171641 A | 7/1988 | |
| JP | 01294830 A | * 11/1989 | ............... C22B 3/16 |
| JP | 2015159064 A | 9/2015 | |

* cited by examiner

METHOD FOR DISSOLVING METALS BY PHOTOCATALYSIS

BACKGROUND OF THE INVENTION

1. Technical Field

The present invention belongs to the application field of photocatalysis, and in particular relates to a method for dissolving metals by photocatalysis.

2. Description of Related Art

Metals are widespread in the natural world. Metals, commonly used in life, are one of the most important and mostly applied substances in modern industry. Metal exploitation and smelting not only brings an impact to the environment, but also consumes 7%-8% of global energy supply. Recycling consumes less energy than primary production of metals, and reduces overall impact on places where mines are exploited. However, constrained by the process and recycling cost, the recovery rate of metals remains at a relatively low level. In particular, noble metals are usually dissolved with nitrohydrochloric acid. Such method hurts environment, and results in very high recycling cost and serious pollution. Therefore, an environmentally-friendly method is in an urgent need for metal refining and recycling. Photocatalysis has great attention from scientific researchers in virtue of advantages in moderate reaction conditions and direct conversion from solar energy into chemical energy, and shows a great application prospect in fields of energy sources and environmental protection. Photocatalysis for metal dissolution brings about an every important opportunity for environmental protection and energy utilization, and makes contribution to transition to a low-carbon and resource-saving green economy.

Chinese Patent, No. CN107586966A, discloses a method for quickly activating and dissolving insoluble noble metals. The method takes nitrohydrochloric acid or acidic sodium chlorate as a solvent to quickly dissolve insoluble noble metals such as iridium and rhodium. However, the activation temperature reaches 1200° C.-1400° C., which is a rigorous condition. In addition, the highly corrosive nitrohydrochloric acid is used in the process. The Chinese patent, No. CN108658133A, discloses a method for quickly dissolving insoluble metal iridium. According to this method, iridium powder and hydrochloric acid are added into a reactor, then stirred while chlorine is introduced to maintain a reaction, and next chlorine removal and liquid-solid separation are carried out. Such method features complicated steps, and temperature rise and pressurization in progress.

BRIEF SUMMARY OF THE INVENTION

The objective of the present invention is to provide a method for dissolving metals by photocatalysis under a moderate and environmentally-friendly condition to overcome defects in the prior art.

The objective of the present invention can be achieved by the following technical solution:

A method for dissolving metals by photocatalysis is provided. The method includes steps of dispersing a metal-containing material to be dissolved in a mixed solution of photocatalyst-containing cyanide and organic chloride, and performing irradiation for a period of time to dissolve metals.

Further, the metals contained in the metal-containing material to be dissolved include a noble metal or common metal.

Further, the noble metal includes one or several ones of ruthenium, rhodium, iridium, gold, silver, platinum and palladium, and the common metal includes one or several ones of iron, manganese, chromium, zinc, tin, lead, aluminum, copper, nickel and cobalt.

Further, the cyanide include one or several ones of acrylonitrile, acetonitrile, phenylacetonitrile, cyanoacetic acid, malononitrile, benzyl cyanide and melamine; and the organic chloride includes one or several ones of dichloromethane, trichlormethane, dichloroethylene, trichloroethane, trichlorethanol and tetrachlormethane.

Further, the photocatalyst includes various organic photocatalystic materials (such as carbon nitride, enzyme, organic supramolecular porphyrin polymers and metallic organic compounds), inorganic photocatalystic materials (such as titanium dioxide, molybdenum disulfide, cadmium sulfide, bismuth bromide, indium oxide and tungsten oxide), semiconductor photocatalytic materials and their modified, surface finished and mutually compounded photocatalytic materials.

Further, the organic photocatalytic materials include carbon nitride, porphyrin, PDI or enzyme; the inorganic photocatalytic materials include titanium dioxide, zinc oxide, copper oxide, bismuth oxide, ferric oxide, gallium oxide, molybdenum disulfide, cadmium sulfide, bismuth bromide, indium oxide and tungsten oxide; the semiconductor photocatalytic materials and their modified, surface finished and mutually compounded photocatalytic materials include an titanium dioxide material with oxygen vacancy, hydroxyl modified titanium dioxide material, two-dimensional titanium dioxide material, nitrogen doped titanium dioxide material, porphyrin-sensitized titanium dioxide, self-assembled porphyrin material which porphyrin includes protoporphyrin, iron porphyrin, magnesium porphyrin or zinc porphyrin, composite materials such as titanium dioxide and amino-modified metallic organic compound material, molybdenum disulfide loaded titanium dioxide, cadmium sulfide quantum dot material, in-situ vulcanized tungsten oxide composite material, phosphorus doped indium oxide material, carbon nitride composite material with nitrogen defects, carbon nitride material modified by a carbon material which the carbon material includes carbon dots, graphene or carbon nanotubes, layered bismuth bromide material, bismuth bromide material with oxygen defects, catalyzing enzyme material and composite material of an organic optical system and an inorganic catalyst.

All foregoing catalysts are commercially available catalysts or those disclosed in this field.

Further, the cyanide includes one or several ones of acrylonitrile, acetonitrile, phenylacetonitrile, cyanoacetic acid, malononitrile, benzyl cyanide and melamine; and the organic chloride include one or several ones of dichloromethane, trichlormethane, dichloroethylene, trichloroethane and tetrachlormethane.

Further, the mass ratio of the cyanide to the organic chloride is (10-10000): (0-1000), preferably (30-5000):(0-500), further preferably (300-500):(10-50). Those two substances are far less toxic than the inorganic cyanide, environmentally-friendly and low in cost.

Further, the content of the photocatalyst in the mixed solution is (0.25-4) mg/mL, and the mass ratio of the metal-containing material to be dissolved to the photocatalyst is 1:(0.1-0.4).

Further, the light wavelength of the irradiation is 150-1500 nm, covering deep ultraviolet light, ultraviolet light, visible light and near infrared light; and the irradiation time is 4-8 h.

Further, an oxygen-containing gas or a chemical substance which can generate oxygen is introduced into the mixed solution in the dissolution process, such that the oxygen content in the mixed solution reaches 5%-100%; and the chemical substance which can generate oxygen includes one or several ones of ozone, hydrogen peroxide and sodium peroxide.

Compared with the prior method, the present invention has the following advantages:
(1) The majority of insoluble metals are noble metals (such as platinum and palladium) which exist in form of elementary substance in the natural world; the photocatalyst can generate free radicals with an oxidizing property to oxidize noble metals by irradiation, thereby dissolving noble metals or common metals;
(2) The photocatalysis reaction proceeds under moderate conditions, and the reacting solution is low in toxicity; and the reaction process is advantageous in energy conservation, environmental protection, low cost, and convenient operation, and is suitable for mass industrial treatment on metal dissolution;
(3) The present invention breaks through existing understanding of the photocatalysis process, and has an instructive significance for revolution of noble metal in environment and for exploitation or purification treatment of noble metals.

DETAILED DESCRIPTION OF THE INVENTION

The present invention is further described in detail in conjunction with the attached drawings and specific embodiment.

Embodiment 1

500 mg material containing 1% of platinum was dispersed in 50 ml mixed solution of acetonitrile and dichloromethane (50:1). Then, 50 mg mixed-phase titanium dioxide photocatalyst was added. Ultraviolet irradiation proceeded in air for 4 h. The dissolution rate of platinum was 81.6%.

Figure 1:
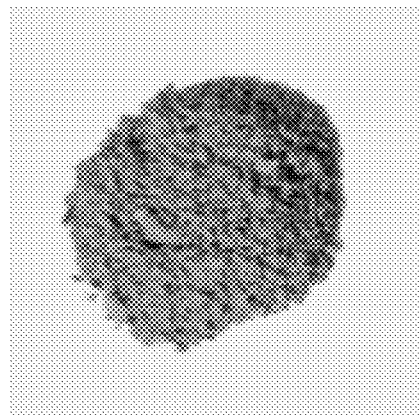
FIG. 1 is a sample diagram before dissolution reaction according to embodiment 1.
Figure 2:
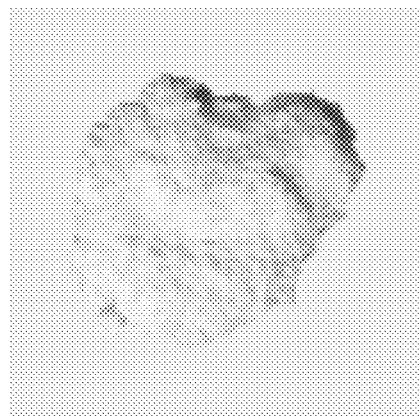
FIG. 2 is a sample diagram after dissolution reaction according to embodiment 1.
Figure 3:
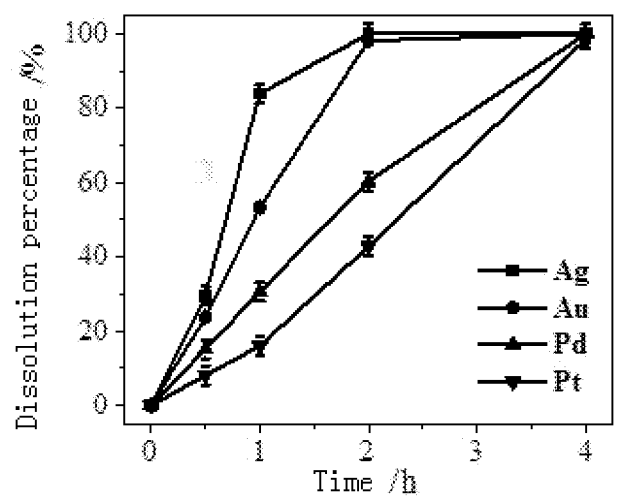
FIG. 3 is a curve graph of dissolution ratio of the dissolution reaction according to embodiment 1.

FIG. 1 and FIG. 2 are sample diagrams before and after the dissolution reaction, respectively. It can be seen that, the sample was gray black before dissolution and was white after the dissolution reaction from FIGS. 1 and 2; and ICP test data in FIG. 3 also apparently show that the ratio of platinum in the liquid increased continuously (a small amount of solution was evaporated to obtain dry solvent, and then water was added in an amount equivalent to that of the solvent to dilute the solvent for testing).

Embodiment 2

500 mg material containing 1% of platinum was dispersed in 100 ml mixed solution of acetonitrile and dichloromethane (50:1). Then, 50 mg mixed-phase titanium dioxide photocatalyst was added. Ultraviolet irradiation proceeded in air for 4 h. The dissolution rate of platinum was 91.4%.

Embodiment 3

500 mg material containing 1% of platinum was dispersed in 200 ml mixed solution of acetonitrile and dichloromethane (50:1). Then, 50 mg mixed-phase titanium dioxide photocatalyst was added. Ultraviolet irradiation proceeded in air for 4 h. The dissolution rate of platinum was 100%.

Embodiment 4

500 mg material containing 1% of platinum was dispersed in 50 ml mixed solution of acetonitrile and dichloromethane (100:3). Then, 50 mg mixed-phase titanium dioxide photocatalyst was added. Ultraviolet irradiation proceeded in air for 4 h. The dissolution rate of platinum was 85.6%.

Embodiment 5

500 mg material containing 1% of platinum was dispersed in 50 ml mixed solution of acetonitrile and dichloromethane (200:3). Then, 50 mg mixed-phase titanium dioxide photocatalyst was added. Ultraviolet irradiation proceeded in air for 4 h. The dissolution rate of platinum was 75.2%.

Embodiment 6

500 mg material containing 1% of platinum was dispersed in 50 ml mixed solution of acetonitrile and dichloromethane (50:1). Then, 50 mg mixed-phase titanium dioxide photocatalyst was added. Visible-light irradiation proceeded in air for 4 h. The dissolution rate of platinum was 87.9%.

Embodiment 7

500 mg material containing 1% of platinum was dispersed in 50 ml mixed solution of acetonitrile and dichloromethane (50:1). Then, 50 mg mixed-phase titanium dioxide photocatalyst was added. Visible light irradiation proceeded in air for 8 h. The dissolution rate of platinum was 100%.

Embodiment 8

500 mg material containing 1% of platinum was dispersed in 50 ml mixed solution of acetonitrile and trichlorethanol (50:1). Then, 50 mg mixed-phase titanium dioxide photocatalyst was added. Ultraviolet irradiation proceeded in air for 4 h. The dissolution rate of platinum was 89%.

Embodiment 9

500 mg material containing 1% of platinum was dispersed in 50 ml mixed solution of acetonitrile and trichlormethane (50:1). Then, 50 mg commercial mixed-phase titanium dioxide catalyst was added. Ultraviolet irradiation proceeded in air for 4 h. The dissolution rate of platinum was 65.3%.

Embodiment 10

500 mg material containing 1% of platinum was dispersed in 50 ml mixed solution of acetonitrile and tetrachlormethane (50:1). Then, 50 mg commercial mixed-phase titanium dioxide catalyst was added. Ultraviolet irradiation proceeded in air for 4 h. The dissolution rate of platinum was 55%.

Embodiment 11

500 mg material containing 1% of platinum was dispersed in 50 ml mixed solution of phenylacetonitrile and dichloromethane (50:1). Then, 50 mg commercial mixed-phase titanium dioxide catalyst was added. Ultraviolet irradiation proceeded in air for 4 h. The dissolution rate of platinum was 73.8%.

Embodiment 12

500 mg material containing 1% of platinum was dispersed in 50 ml mixed solution of phenylacetonitrile and trichlorethanol (50:1). Then, 50 mg commercial mixed-phase titanium dioxide catalyst was added. Ultraviolet irradiation proceeded in air for 4 h. The dissolution rate of platinum was 80%.

Embodiment 13

500 mg material containing 1% of platinum was dispersed in 50 ml mixed solution of phenylacetonitrile and trichlormethane (50:1). Then, 50 mg commercial mixed-phase titanium dioxide catalyst was added. Ultraviolet irradiation proceeded in air for 4 h. The dissolution rate of platinum was 77.6%.

Embodiment 14

500 mg material containing 1% of platinum was dispersed in 50 ml mixed solution of phenylacetonitrile and tetrachlormethane (50:1). Then, 50 mg commercial mixed-phase titanium dioxide catalyst was added. Ultraviolet irradiation proceeded in air for 4 h. The dissolution rate of platinum was 68.2%.

Embodiment 15

500 mg material containing 1% of platinum was dispersed in 50 ml mixed solution of acetonitrile and dichloromethane (50:1). 50 mg commercial mixed-phase titanium dioxide catalyst was added. Ultraviolet irradiation proceeded for 4 h in an atmosphere with 25% of oxygen. The dissolution rate of platinum was 80%.

Embodiment 16

500 mg material containing 1% of platinum was dispersed in 50 ml mixed solution of acetonitrile and dichloromethane (50:1). Then, 50 mg commercial mixed-phase titanium dioxide catalyst was added. Ultraviolet irradiation proceeded for 4 h in an atmosphere with 50% of oxygen. The dissolution rate of platinum was 92.5%.

Embodiment 17

500 mg material containing 1% of platinum was dispersed in 50 ml mixed solution of acetonitrile and dichloromethane (50:1). Then, 50 mg commercial mixed-phase titanium dioxide catalyst was added. Ultraviolet irradiation proceeded for 4 h in an atmosphere with 75% of oxygen. The dissolution rate of platinum was 95.8%.

Embodiment 18

500 mg material containing 1% of platinum was dispersed in 50 ml mixed solution of acetonitrile and dichloromethane (50:1). Then, 50 mg commercial mixed-phase titanium dioxide catalyst was added. Ultraviolet irradiation proceeded for 4 h in an atmosphere with 100% of oxygen. The dissolution rate of platinum was 100%.

Embodiment 19

500 mg material containing 1% of platinum was dispersed in 50 ml mixed solution of acetonitrile and dichloromethane (50:1). Then, 100 mg commercial mixed-phase titanium dioxide catalyst was added. Ultraviolet irradiation proceeded in air for 4 h. The dissolution rate of platinum was 90.5%.

Embodiment 20

500 mg material containing 1% of platinum was dispersed in 50 ml mixed solution of acetonitrile and dichloromethane (50:1). Then, 200 mg commercial mixed-phase titanium dioxide catalyst was added. Ultraviolet irradiation proceeded in air for 4 h. The dissolution rate of platinum was 100%.

Embodiment 21

500 mg material containing 1% of palladium was dispersed in 50 ml mixed solution of acrylonitrile and trichlorethanol (1000:10). Then, 50 mg commercial mixed-phase titanium dioxide catalyst was added. Next, a gas containing 20% of oxygen was introduced. Irradiation by ultraviolet light with a 365 nm wavelength proceeded for 5 h. The dissolution rate of palladium was 88.4%.

Embodiment 22

500 mg material containing 1% of rhodium was dispersed in 70 ml mixed solution of malononitrile and trichlormethane (1000:900). Then, 80 mg mixed-phase titanium dioxide catalyst was added. Next, a gas containing 30% of oxygen was introduced. Irradiation by deep ultraviolet light with a 150 nm wavelength proceeded for 5 h. The dissolution rate of rhodium was 84.2%.

Embodiment 23

500 mg material containing 1% of iridium was dispersed in 90 ml mixed solution of benzyl cyanide and dichloroethylene (2000:800). Then, 95 mg commercial mixed-phase titanium dioxide catalyst was added. Next, a gas containing 50% of oxygen was introduced. Irradiation by ultraviolet light with a 365 nm wavelength proceeded for 5.5 h. The dissolution rate of iridium was 95.6%.

Embodiment 24

500 mg material containing 1% of gold was dispersed in 100 ml mixed solution of cyanoacetic acid and dichloroethylene (3000:700). Then, 150 mg commercial mixed-phase titanium dioxide catalyst was added. Next, a gas containing 30% of oxygen was introduced. Irradiation by ultraviolet light with a 365 nm wavelength proceeded for 3 h. The dissolution rate of gold was 100%.

Embodiment 25

500 mg material containing 1% of silver was dispersed in 120 ml mixed solution of melamine and dichloromethane (4000:600). Then, 130 mg cadmium sulfide catalyst was added. Next, a gas containing 40% of oxygen was introduced. Irradiation by visible light with a 420 nm wavelength proceeded for 4 h. The dissolution rate of silver was 100%.

Embodiment 26

500 mg material containing 1% of copper was dispersed in 100 ml mixed solution of acrylonitrile and trichlormethane (5000:500). Then, 150 mg cadmium sulfide catalyst was added. Next, a gas containing 50% of oxygen was introduced. Irradiation by visible light with a 550 nm wavelength proceeded for 7 h. The dissolution rate of copper was 100%.

Embodiment 27

500 mg material containing 1% of iron was dispersed in 160 ml mixed solution of acrylonitrile and trichlormethane (6000:400). Then, 150 mg cadmium sulfide catalyst was added. Next, a gas containing 60% of oxygen was introduced. Irradiation by visible light with a 550 nm wavelength proceeded for 7 h. The dissolution rate of iron was 100%.

Embodiment 28

500 mg material containing 1% of nickel was dispersed in 199 ml mixed solution of acrylonitrile and trichlormethane (10000:0). Then, 200 mg cadmium sulfide catalyst was added. Next, ozone was introduced. Irradiation by visible light with a 550 nm wavelength proceeded for 7.9 h. The dissolution rate of nickel was 100%.

Embodiment 29

500 mg material containing 1% of platinum was dispersed in 50 ml mixed solution of acetonitrile and dichloromethane (50:1). Then, 50 mg zinc porphyrin (Zn-porphyrin) catalyst was added. Visible-light irradiation proceeded in air for 4 h. The dissolution rate of platinum was 100%.

Embodiment 30

500 mg material containing 1% of platinum was dispersed in 50 ml mixed solution of acetonitrile and dichloromethane (50:1). Then, 50 mg porphyrin-based metallic organic compound (PCN-222) catalyst was added. Visible-light irradiation proceeded in air for 4 h. The dissolution rate of platinum was 100%.

Embodiment 31

500 mg material containing 1% of platinum was dispersed in 50 ml mixed solution of acetonitrile and dichloromethane (50:1). Then, 50 mg self-assembled porphyrin nano-sheet (SA-TCPP) catalyst was added. Visible-light irradiation proceeded in air for 4 h. The dissolution rate of platinum was 100%.

Embodiment 32

500 mg material containing 1% of platinum was dispersed in 50 ml mixed solution of acetonitrile and dichloromethane (50:1). Then, 50 mg porphyrin loaded titanium dioxide (TCPP-$TiO_2$) catalyst was added. Visible-light irradiation proceeded in air for 4 h. The dissolution rate of platinum was 100%.

Embodiment 33

500 mg material containing 1% of platinum was dispersed in 50 ml mixed solution of acetonitrile and dichloromethane (50:1). Then, 50 mg titanium dioxide (OV—$TiO_2$) rich in oxygen defects catalyst was added. Visible-light irradiation proceeded in air for 4 h. The dissolution rate of platinum was 100%.

Embodiment 34

500 mg material containing 1% of platinum was dispersed in 50 ml mixed solution of acetonitrile and dichloromethane (50:1). Then, 50 mg hydroxyl modified titanium dioxide (OH—$TiO_2$) catalyst was added. Visible-light irradiation proceeded in air for 4 h. The dissolution rate of platinum was 100%.

Embodiment 35

500 mg material containing 1% of platinum was dispersed in 50 ml mixed solution of acetonitrile and dichloromethane (50:1). Then, 50 mg two-dimensional titanium dioxide (2D-$TiO_2$) catalyst was added. Visible-light irradiation proceeded in air for 4 h. The dissolution rate of platinum was 100%.

Embodiment 36

500 mg material containing 1% of platinum was dispersed in 50 ml mixed solution of acetonitrile and dichloromethane (50:1). Then, 50 mg titanium-dioxide and amino-modified metallic organic compound ($TiO_2$@$NH_2$-MIL-125) catalyst was added. Visible-light irradiation proceeded in air for 4 h. The dissolution rate of platinum was 100%.

Embodiment 37

500 mg material containing 1% of platinum was dispersed in 50 ml mixed solution of acetonitrile and dichloromethane (50:1). Then, 50 mg nitrogen doped titanium dioxide (N—$TiO_2$) catalyst was added. Visible-light irradiation proceeded in air for 4 h. The dissolution rate of platinum was 100%.

Embodiment 38

500 mg material containing 1% of platinum was dispersed in 50 ml mixed solution of acetonitrile and dichloromethane (50:1). Then, 50 mg titanium dioxide (H—$TiO_{2-x}$) rich in trivalent titanium ions catalyst was added. Visible-light irradiation proceeded in air for 4 h. The dissolution rate of platinum was 100%.

Embodiment 39

500 mg material containing 1% of platinum was dispersed in 50 ml mixed solution of acetonitrile and dichloromethane (50:1). Then, 50 mg anatase-phase titanium dioxide catalyst was added. Ultraviolet irradiation proceeded in air for 4 h. The dissolution rate of platinum was 100%.

Embodiment 40

500 mg material containing 1% of platinum was dispersed in 50 ml mixed solution of acetonitrile and dichloromethane (50:1). Then, 50 mg molybdenum disulfide loaded titanium dioxide ($MoS_2/TiO_2$) catalyst was added. Visible-light irradiation proceeded in air for 4 h. The dissolution rate of platinum was 100%.

Embodiment 41

500 mg material containing 1% of platinum was dispersed in 50 ml mixed solution of acetonitrile and dichloromethane (50:1). Then, 50 mg a compound of molybdenum disulfide and cadmium sulfide ($MoS_2/CdS$) compound catalyst was added. Visible-light irradiation proceeded in air for 4 h. The dissolution rate of platinum was 100%.

Embodiment 42

500 mg material containing 1% of platinum was dispersed in 50 ml mixed solution of acetonitrile and dichloromethane (50:1). Then, 50 mg cadmium sulfide quantum dots (CdS QDs) liquid catalyst was added. Visible light irradiation proceeded in air for 4 h. The dissolution rate of platinum was 100%.

Embodiment 43

500 mg material containing 1% of platinum was dispersed in 50 ml mixed solution of acetonitrile and dichloromethane (50:1). Then, 50 mg in-situ vulcanized oxide ($W_2S/WO_3$) catalyst was added. Visible-light irradiation proceeded in air for 4 h. The dissolution rate of platinum was 100%.

Embodiment 44

500 mg material containing 1% of platinum was dispersed in 50 ml mixed solution of acetonitrile and dichloromethane (50:1). Then, 50 mg phosphorus-doped indium oxide (P—$In_2O_3$) catalyst was added. Visible-light irradiation proceeded in air for 4 h. The dissolution rate of platinum was 100%.

Embodiment 45

500 mg material containing 1% of platinum was dispersed in 50 ml mixed solution of acetonitrile and dichloromethane (50:1). Then, 50 mg carbon nitride (g-$C_3N_x$) with nitrogen defects catalyst was added. Visible-light irradiation proceeded in air for 4 h. The dissolution rate of platinum was 100%.

Embodiment 46

500 mg material containing 1% of platinum was dispersed in 50 ml mixed solution of acetonitrile and dichloromethane (50:1). Then, 50 mg carbon-dots modified carbon nitride (C Dots-$C_3N_4$) catalyst was added. Visible-light irradiation proceeded in air for 4 h. The dissolution rate of platinum was 100%.

Embodiment 47

500 mg material containing 1% of platinum was dispersed in 50 ml mixed solution of acetonitrile and dichloromethane (50:1). Then, 50 mg enzyme catalyst was added. Visible-light irradiation proceeded in air for 4 h. The dissolution rate of platinum was 100%.

Embodiment 48

500 mg material containing 1% of platinum was dispersed in 50 ml mixed solution of acetonitrile and dichloromethane (50:1). Then, 50 mg compound catalyst of organic optical system and inorganic compound (PSII/$Ru_2S_3$/CdS) was added. Visible-light irradiation proceeded in air for 4 h. The dissolution rate of platinum was 100%.

Embodiment 49

500 mg material containing 1% of platinum was dispersed in 50 ml mixed solution of acetonitrile and dichloromethane (50:1). Then, 50 mg bismuth bromide nanosheets with (001) face exposed (BiOBr nanosheets) catalyst was added. Visible-light irradiation proceeded in air for 4 h. The dissolution rate of platinum was 100%.

Embodiment 50

500 mg material containing 1% of platinum was dispersed in 50 ml mixed solution of acetonitrile and dichloromethane (50:1). Then, 50 mg bismuth bromide with defects ($Bi_5O_7Br$) catalyst was added. Visible-light irradiation proceeded in air for 4 h. The dissolution rate of platinum was 100%.

Embodiment 51

500 mg material containing 1% of platinum was dispersed in 50 ml mixed solution of acetonitrile and dichloromethane (50:1). Then, 50 mg zinc oxide catalyst was added. Ultraviolet irradiation proceeded in air for 4 h. The dissolution rate of platinum was 100%.

Embodiment 52

500 mg material containing 1% of platinum was dispersed in 50 ml mixed solution of acetonitrile and dichloromethane (50:1). Then, 50 mg copper oxide catalyst was added. Ultraviolet irradiation proceeded in air for 4 h. The dissolution rate of platinum was 100%.

Embodiment 53

500 mg material containing 1% of platinum was dispersed in 50 ml mixed solution of acetonitrile and dichloromethane (50:1). Then, 50 mg bismuth oxide catalyst was added. Ultraviolet irradiation proceeded in air for 4 h. The dissolution rate of platinum was 100%.

Embodiment 54

500 mg material containing 1% of platinum was dispersed in 50 ml mixed solution of acetonitrile and dichloromethane (50:1). Then, 50 mg ferric oxide catalyst was added. Ultraviolet irradiation proceeded in air for 4 h. The dissolution rate of platinum was 100%.

Embodiment 55

500 mg material containing 1% of platinum was dispersed in 50 ml mixed solution of acetonitrile and dichloromethane (50:1). Then, 50 mg gallium oxide catalyst was added. Ultraviolet irradiation proceeded in air for 4 h. The dissolution rate of platinum was 100%.

The foregoing embodiments are used merely to describe the technical solution of the present invention, and shall not be construed as limiting the present invention. All changes, substitutions, modifications and simplifications made by an ordinarily skilled in the art within the substantial scope of the present invention are equivalent changes, which do not depart from the tenet of the present invention and shall fall within the protective scope of the present invention.

What is claimed is:

1. A method for dissolving metals by photocatalysis, characterized in that the method comprises steps of dispersing a metal-containing material to be dissolved in a mixed solution of photocatalyst-containing cyanide and organic chloride, and performing irradiation for a period of time to dissolve metals.

2. The method for dissolving metals by photocatalysis according to claim 1, wherein the metals contained in the metal-containing material to be dissolved comprise a noble metal.

3. The method for dissolving metals by photocatalysis according to claim 2, wherein the noble metal comprises one or several ones of ruthenium, rhodium, iridium, gold, silver, platinum and palladium.

4. The method for dissolving metals by photocatalysis according to claim 1, wherein a photocatalyst of the mixed solution of photocatalyst-containing cyanide and organic chloride comprises organic, inorganic and semiconductor photocatalytic materials and their modified, surface finished and mutually compounded photocatalytic materials.

5. The method for dissolving metals by photocatalysis according to claim 4, wherein the organic photocatalytic materials comprise carbon nitride, PDI, porphyrin or enzyme; the inorganic photocatalytic materials comprise titanium dioxide, zinc oxide, copper oxide, bismuth oxide, ferric oxide, gallium oxide, molybdenum disulfide, cadmium sulfide, bismuth bromide, indium oxide and tungsten oxide; the semiconductor photocatalytic materials and their modified, surface finished and mutually compounded photocatalytic materials comprise titanium dioxide material with an oxygen vacancy, hydroxyl modified titanium dioxide material, two-dimensional titanium dioxide material, nitrogen doped titanium dioxide material, porphyrin-sensitized titanium dioxide, self-assembled porphyrin material where porphyrin includes protoporphyrin, iron porphyrin, magnesium porphyrin or zinc porphyrin, titanium-dioxide and amino-modified metallic organic compound material, molybdenum disulfide loaded titanium dioxide, cadmium sulfide, cadmium sulfide quantum dot material, in-situ vulcanized tungsten oxide composite material, phosphorus-doped indium oxide material, carbon nitride composite material with nitrogen defects, carbon nitride material modified by carbon material where the carbon material includes carbon dots, graphene or carbon nano-tubes, layered bismuth bromide material, bismuth bromide material with oxygen defects, catalyzing enzyme material, and composite material of organic optical system and an inorganic catalyst.

6. The method for dissolving metals by photocatalysis according to claim 1, wherein the cyanide comprises one or several ones of acrylonitrile, acetonitrile, phenylacetonitrile, cyanoacetic acid, malononitrile, benzyl cyanide and melamine; and the organic chloride includes one or several ones of dichloromethane, trichlormethane, dichloroethylene, trichloroethane, trichlorethanol and tetrachlormethane.

7. The method for dissolving metals by photocatalysis according to claim 1, wherein the mass ratio of the cyanide to the organic chloride is (10-10000):(0-1000).

8. The method for dissolving metals by photocatalysis according to claim 1, wherein the content of a photocatalyst in the mixed solution is (0.25-4) mg/mL, and the mass ratio of the metal-containing material to be dissolved to the photocatalyst is 1:(0.1-0.4).

9. The method for dissolving metals by photocatalysis according to claim 1, wherein the light wavelength of the irradiation is 150-1500 nm, covering deep ultraviolet light, ultraviolet light, visible light and near infrared light; and the irradiation time is 4-8 h.

10. The method for dissolving metals by photocatalysis according to claim 1, wherein an oxygen-containing gas or a chemical substance which can generate oxygen is introduced into the mixed solution in the dissolution process, such that the oxygen content in the mixed solution reaches 5%-100%; and the chemical substance which is capable of generating oxygen comprises one or several ones of ozone, hydrogen peroxide and sodium peroxide.

11. The method for dissolving metals by photocatalysis according to claim 1, wherein the metals contained in the metal-containing material to be dissolved comprises a metal selected from the group consisting of iron, manganese, chromium, zinc, tin, lead, aluminum, copper, nickel, or cobalt, or a combination thereof.

12. The method for dissolving metals by photocatalysis according to claim 1, wherein the photocatalyst includes an organic or inorganic semiconductor photocatalytic material, a modified semiconductor photocatalytic material, or a surface modified semiconductor photocatalytic material.

* * * * *